US007543118B1

(12) United States Patent
Chen et al.

(10) Patent No.: US 7,543,118 B1
(45) Date of Patent: Jun. 2, 2009

(54) MULTIPLE VARIANCE PLATFORM FOR THE MANAGEMENT OF MOBILE DEVICES

(75) Inventors: Shao-Chun Chen, Aliso Viejo, CA (US); James P. Gustafson, Irvine, CA (US); Sunil Marolia, Dana Point, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 11/125,974

(22) Filed: May 9, 2005

Related U.S. Application Data (60) Provisional application No. 60/568,898, filed on May 7, 2004.

(51) Int. Cl.
*G06F 13/00* (2006.01)
*G06F 13/28* (2006.01)
(52) U.S. Cl. ...................................... 711/154; 717/168
(58) Field of Classification Search .................. 717/168; 711/154
See application file for complete search history.

(56) References Cited

U.S. PATENT DOCUMENTS

| 5,084,816 A | 1/1992 | Boese et al. |
|---|---|---|
| 5,261,055 A | 11/1993 | Moran et al. |
| 5,442,771 A | 8/1995 | Filepp et al. |
| 5,479,637 A | 12/1995 | Lisimaque et al. |
| 5,579,522 A | 11/1996 | Christeson et al. |
| 5,596,738 A | 1/1997 | Pope |
| 5,598,534 A | 1/1997 | Haas |
| 5,608,910 A | 3/1997 | Shimakura |
| 5,623,604 A | 4/1997 | Russell et al. |
| 5,666,293 A | 9/1997 | Metz et al. |
| 5,752,039 A | 5/1998 | Tanimura |
| 5,778,440 A | 7/1998 | Yiu et al. |
| 5,790,974 A | 8/1998 | Tognazzini |
| 5,878,256 A | 3/1999 | Bealkowski et al. |
| 5,960,445 A | 9/1999 | Tamori et al. |
| 5,968,182 A | 10/1999 | Chen et al. |
| 6,009,497 A | 12/1999 | Wells et al. |
| 6,018,747 A | 1/2000 | Burns et al. |

(Continued)

FOREIGN PATENT DOCUMENTS

CA      2339923 A      3/2000

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Matt Kim
*Assistant Examiner*—Edward J Dudek (57) ABSTRACT

A multiple variance platform supports device management of mobile devices in a carrier network. Applications stored in a file system residing in non-volatile memory may be updated, along with firmware code. Updates of files may be performed before file system support is provided by an operating system that enables normal operations of the electronic device. Update agent code may reside in a kernel that runs beneath the operating system, or may act as a separate entity. The non-volatile memory may comprise multiple non-volatile memory chips such as NAND-based flash memory. The firmware code may be compressed as in Linux based mobile devices.

17 Claims, 8 Drawing Sheets

U.S. PATENT DOCUMENTS

| | | | |
|---|---|---|---|
| 6,038,636 | A | 3/2000 | Brown, III et al. |
| 6,064,814 | A | 5/2000 | Capriles et al. |
| 6,073,206 | A | 6/2000 | Piwonka et al. |
| 6,073,214 | A | 6/2000 | Fawcett |
| 6,088,759 | A | 7/2000 | Hasbun et al. |
| 6,105,063 | A | 8/2000 | Hayes, Jr. |
| 6,112,024 | A | 8/2000 | Almond et al. |
| 6,112,197 | A | 8/2000 | Chatterjee et al. |
| 6,126,327 | A | 10/2000 | Bi et al. |
| 6,128,695 | A | 10/2000 | Estakhri et al. |
| 6,138,249 | A | 10/2000 | Nolet |
| 6,157,559 | A | 12/2000 | Yoo |
| 6,163,274 | A | 12/2000 | Lindgren |
| 6,198,946 | B1 | 3/2001 | Shin et al. |
| 6,279,153 | B1 | 8/2001 | Bi et al. |
| 6,301,710 | B1 | 10/2001 | Fujiwara |
| 6,311,322 | B1 | 10/2001 | Ikeda et al. |
| 6,343,379 | B1 | 1/2002 | Ozawa et al. |
| 6,381,740 | B1 | 4/2002 | Miller et al. |
| 6,408,434 | B1 | 6/2002 | Fujiwara |
| 6,438,585 | B2 | 8/2002 | Mousseau et al. |
| 6,526,574 | B1 | 2/2003 | Jones |
| 6,615,038 | B1 | 9/2003 | Moles et al. |
| 6,615,404 | B1 | 9/2003 | Garfunkel et al. |
| 6,668,336 | B2 | 12/2003 | Lasser |
| 6,725,056 | B1 | 4/2004 | Moles et al. |
| 6,725,392 | B1 | 4/2004 | Frey et al. |
| 6,832,373 | B2 | 12/2004 | O'Neill |
| 6,836,657 | B2 | 12/2004 | Ji et al. |
| 6,925,467 | B2 | 8/2005 | Gu et al. |
| 6,928,108 | B2 | 8/2005 | Nelson et al. |
| 2001/0029178 | A1 | 10/2001 | Criss et al. |
| 2001/0047363 | A1 | 11/2001 | Peng |
| 2001/0048728 | A1 | 12/2001 | Peng |
| 2002/0072359 | A1 | 6/2002 | Moles et al. |
| 2002/0078209 | A1 | 6/2002 | Peng |
| 2002/0116261 | A1 | 8/2002 | Moskowitz et al. |
| 2002/0128994 | A1* | 9/2002 | Sadhasivan et al. ............ 707/1 |
| 2002/0131404 | A1 | 9/2002 | Mehta et al. |
| 2002/0152005 | A1 | 10/2002 | Bagnordi |
| 2002/0156863 | A1 | 10/2002 | Peng |
| 2002/0157090 | A1 | 10/2002 | Anton, Jr. |
| 2003/0023964 | A1 | 1/2003 | Rajaram et al. |
| 2003/0027563 | A1 | 2/2003 | Herle et al. |
| 2003/0033599 | A1 | 2/2003 | Rajaram et al. |
| 2003/0037075 | A1 | 2/2003 | Hannigan et al. |
| 2003/0061384 | A1 | 3/2003 | Nakatani |
| 2003/0074658 | A1 | 4/2003 | Kim |
| 2003/0084435 | A1 | 5/2003 | Messer et al. |
| 2003/0121032 | A1 | 6/2003 | Cho et al. |
| 2003/0162533 | A1 | 8/2003 | Moles et al. |
| 2003/0182414 | A1* | 9/2003 | O'Neill .................... 709/223 |
| 2003/0186689 | A1 | 10/2003 | Herle et al. |
| 2004/0015952 | A1 | 1/2004 | Lajoie et al. |
| 2004/0031031 | A1 | 2/2004 | Rudelic |
| 2004/0034853 | A1 | 2/2004 | Gibbons et al. |
| 2004/0054995 | A1 | 3/2004 | Lee |
| 2004/0111723 | A1 | 6/2004 | Moles et al. |
| 2004/0117785 | A1 | 6/2004 | Kincaid |
| 2004/0123282 | A1* | 6/2004 | Rao .......................... 717/168 |
| 2004/0133887 | A1 | 7/2004 | Herle et al. |
| 2004/0152455 | A1 | 8/2004 | Herle |
| 2004/0261072 | A1 | 12/2004 | Herle |
| 2004/0261073 | A1 | 12/2004 | Herle et al. |
| 2005/0060699 | A1 | 3/2005 | Kim et al. |
| 2005/0097544 | A1 | 5/2005 | Kim |
| 2005/0132179 | A1* | 6/2005 | Glaum et al. .................. 713/1 |
| 2005/0144609 | A1 | 6/2005 | Rothman et al. |
| 2005/0144612 | A1 | 6/2005 | Wang et al. |
| 2005/0160195 | A1 | 7/2005 | Bruner et al. |
| 2005/0216902 | A1 | 9/2005 | Schafer |
| 2005/0216903 | A1 | 9/2005 | Schafer |

FOREIGN PATENT DOCUMENTS

| | | |
|---|---|---|
| JP | 82002626 A | 8/1996 |
| KR | 2002-0034228 A1 | 5/2000 |
| KR | 2001-0100328 A1 | 11/2001 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the 1st ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Computer Dictionary Microsoft Press Third Edition, pp. 88, 190, 1997.

* cited by examiner

MULTIPLE VARIANCE PLATFORM FOR THE MANAGEMENT OF MOBILE DEVICES

RELATED APPLICATIONS

The present application makes reference to, claims priority to, and claims benefit of U.S. Provisional Patent Application Ser. No. 60/568,898, entitled "MULTIPLE VARIANCE PLATFORM FOR THE MANAGEMENT OF MOBILE DEVICES", filed May 7, 2004, the complete subject matter of which is hereby incorporated herein by reference, in its entirety.

The present application makes reference to PCT Application having publication number WO/02/41147 A1 and PCT Application No. PCT/US01/44034, entitled "System and Method for Updating and Distributing Information", filed Nov. 19, 2001, the complete subject matter of which is hereby incorporated herein by reference, in its entirety.

The present application also makes reference to U.S. Provisional Patent Application Ser. No. 60/249,606, entitled "System and Method for Updating and Distributing Information", filed Nov. 17, 2000, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices, such as mobile phones and personal digital assistants (PDA's), often contain firmware and application software that are either provided by the manufacturers of the electronic devices, by telecommunication carriers, or by third parties. When a build of the memory image of firmware for an electronic device is created in a manufacturing or product development environment, often the information regarding the components in the build are lost or discarded. Thus, the subsequent execution of another build cannot make use of information from a previous build. In situations where it is important to discover how a given build is different from a previous build, there is often limited information available that is inadequate to determine the changes between builds.

There is a problem in updating devices with file-systems. There is a problem in saving update packages in file-systems such that an application, such as an update agent, can access it when the file-system is not available.

There is a problem of updating file-system based components in device with NAND based flash memory. There is a problem of implementing fault-tolerant updates of components or files in NAND flash memory.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or device supporting firmware update using an update agent in a mobile device, an MVP server for distributing update packages to mobile devices, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Aspects of the present invention relate generally to the process of the management of mobile devices, and, more specifically, to the generation and distribution of update packages used to update software/firmware in mobile devices. The following discussion makes reference to the term "electronic device" that is used herein to refer to mobile electronic devices such as, for example, a mobile handset, a cellular phone, a personal digital assistant (PDA), a pager, and a personal computer, to name just a few. Although the listed example electronic devices are mobile devices, application of the present invention is not limited in this manner, as representative embodiments of the present invention may be employed in a wide variety of electronic devices, both fixed and mobile.

Electronic devices may be adapted to access servers to retrieve update information for updating memory in the electronic devices. An electronic device may be, for example, a mobile electronic device having firmware/software such as mobile cellular phone handsets, personal digital assistants (PDAs), pagers, MP-3 players, digital cameras, etc. Update information may comprise information that modifies or changes firmware/software and/or software components installed in the electronic device. In a representative embodiment of the present invention, update information may comprise a set of executable instructions for converting a first version of code to an updated/second version of code. The update information may add new services to the electronic device, as desired by a service provider, device manufacturer, or an end-user, and/or may fix bugs (e.g., software errors) in the operating code of the electronic device. In a representative embodiment of the present invention, update information may comprise an update package.

Figure 1:
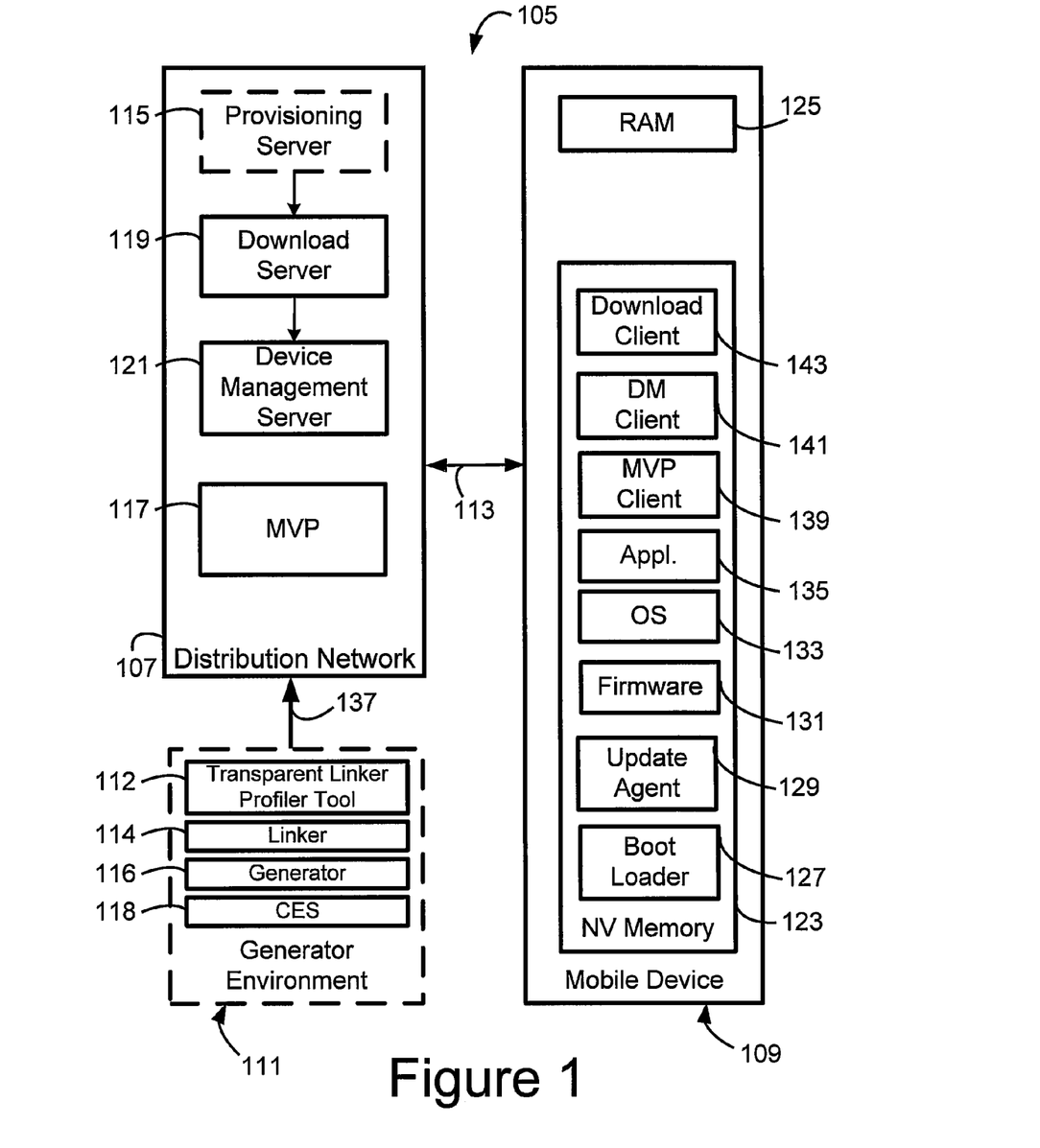
FIG. 1 is perspective block diagram of a mobile network comprising a mobile device with a non-volatile memory, a distribution network with which the mobile device is communicatively coupled via communication path, in accordance with a representative embodiment of the present invention.

FIG. 1 is perspective block diagram of a mobile network 105 comprising a mobile device 109 with a non-volatile memory 123, a distribution network 107 with which the mobile device 109 is communicatively coupled via communication path 113, in accordance with a representative embodiment of the present invention. The mobile network 105 of FIG. 1 also comprises a generator environment 111 that is communicatively coupled to the distribution network 107 via communication path 137. In a representative embodiment of the present invention, the communication paths 113, 137 may comprise, for example, wired and/or wireless networks such as cellular networks, intranet networks, Internet networks, public switched telephone networks, and/or any combination. In a representative embodiment of the present invention, a generator 116 in the generator environment 111 may generate update packages by that are distributed by the distribution network 107 to the mobile device 109, to be used in updating firmware and/or software in the mobile device 109.

As shown in the illustration of FIG. 1, the mobile device 109 comprises non-volatile memory 123 and RAM 125. The non-volatile memory 123 comprises a boot loader 127, an update agent 129, a firmware 131, an operating system (OS) 133, and applications 135. The update agent 129 may be employed by the electronic device to update a firmware and/or software resident in the NV memory 123. The update agent 129 may be described as being 'close-to the-metal', meaning that the update agent 129 may be adapted to be compatible with specific aspects of the hard circuitry of the mobile device 109. In a representative embodiment of the present invention, the update agent 129 may be part of the firmware 131 of the mobile device 109, and may be capable of updating the firmware 131 in a fault-tolerant mode, using a bank-by-bank update process. The status of the update activity may not be progressively stored, but may instead be determined using pre-computed cyclic redundancy check (CRC)) values or digital signatures provided in an update package retrieved from the distribution network 107.

In a representative embodiment of the present invention, the update agent 129 may be self-updating, i.e. the update agent 129 may be capable of updating itself. The update agent 129 may be capable of using update packages generated by the generator 116 in the generator environment 111 to update firmware and/or software in the mobile device 109.

In a representative embodiment of the present invention, a generator environment such as the generator environment 111, for example, may employ a transparent linker profiler tool 112 that facilitates the collection of profile information generated during a linker phase of a build of firmware and/or software. The profile information may be stored into a profile database such that it can be used in subsequent builds of firmware and/or software. The transparent linker profiler tool 112 may employ a linker 114 that may comprise, for example, a conventional linker for linking object code files into a firmware/software binary image. The transparent linker profiler tool 112 may also employ a code expansion slot (CES) tool 118 that may cause the automatic insertion of unused segments of memory in a firmware binary image. By inserting code expansion slots following segments of code that are expected to be dynamic and undergo future change, a representative embodiment of the present invention reduces the volume of changed code, by eliminating unnecessary movement of code that follows the changing or dynamic code. As shown in FIG. 1, the generator environment 111 may also comprise a generator 116 that may take first and second firmware versions, and generate a package of update information, referred to herein as an update package. The update package may comprise a set of executable instructions for converting the first version of firmware into the second version of firmware, in an electronic device such as, for example, the mobile device 109. In a representative embodiment of the present invention, the generator environment 111 may be incorporated into the distribution network 107.

In a representative embodiment of the present invention, the distribution network 107 may comprise a device management (DM) server 121 and a multiple variance platform (MVP) 117 that is used to manage the mobile device 109. As shown in FIG. 1, the distribution network 107 may also comprise a provisioning server 115 communicatively coupled to a download server 119. In a representative embodiment of the present invention, the download server 119 may be communicatively coupled to the DM server 121. The mobile device 109 may comprise a MVP client 139, a download client 143, and a device management client 141 that may reside in NV memory 123, for example.

In a representative embodiment of the present invention, the mobile device 109 may comprise a NAND-based NV memory 123, and the update agent 129 may be capable of updating the NAND-based NV memory using fault-tolerant means. For example, the update agent 129 may employ a bank-by-bank method in which a point of interruption of the update process is determined by comparing cyclic redundancy check (CRC) values against previously computed CRC values that may be communicated to the mobile device 109, instead of storing status information in the NV memory 123 of the mobile device 109 during the update process.

A multiple variance platform in accordance with a representative embodiment of the present invention such as, for example, the multiple variance platform 117 of FIG. 1 makes it possible to perform device management of electronic devices like mobile device 109, for example, in carrier networks. Carrier networks may include, for example, cellular networks, paging networks, and other forms of wired and wireless networks. Such mobile devices may employ multiple processors, may comprise an operating system (O/S) such as the Symbian operating system by Symbian, Ltd., and may employ multiple non-volatile memory chips (e.g., flash non-volatile memory chips). A firmware image in the mobile device 109 may be compressed such as, for example, in a Linux-based mobile device. An update agent like the update agent 129, for example, that is in accordance with a representative embodiment of the present invention may be capable of performing file-based operating system updates.

In a representative embodiment of the present invention, the MVP platform 117 may be designed to be used with application servers such as the Tomcat open-source implementation of Java Servlet and JavaServer Pages technologies by the Apache Software Foundation, and Weblogic server platform by BEA Systems, Inc., that are capable of supporting a version of SSL, including the latest version of 3.0. The MVP platform 117 may also support any version of transport layer security (TLS). The MVP platform 117 may support encryption such as, for example, 128 bit encryption, and may support any of the standard encryption algorithms. In a representative embodiment of the present invention, the MVP platform 117 may support the most commonly used secure sockets layer (SSL) cipher suites, and key exchange mechanisms such as, for example, the RSA key exchange. In a representative embodiment of the present invention, use of the SSL protocol may require that the a client such as, for example, the MVP client 139 create a digital signature via a one-way hash, from data randomly generated during the handshake and known only to the client, and a server. The data hash may then be encrypted with a private key that corresponds to a public key in a certificate being presented to the server. As long as SSL-enabled client software is able to use any of the standard techniques of public-key cryptography, an MVP in accordance with a representative embodiment of the present invention may support the technique.

Figure 2:
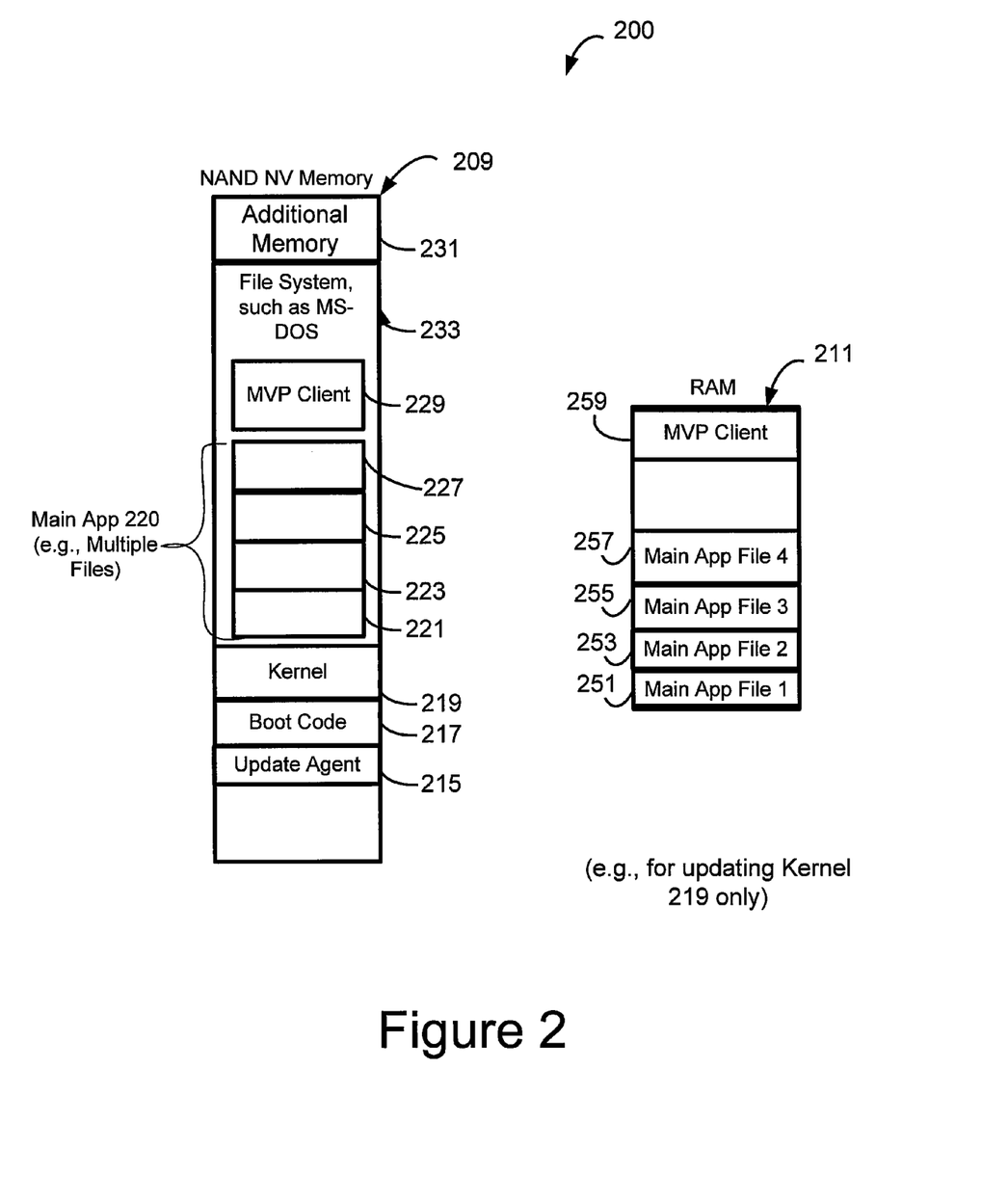
FIG. 2 is a perspective block diagram showing an exemplary memory layout of an electronic device that may correspond to, for example, the mobile device of FIG. 1, in accordance with a representative embodiment of the present invention.

FIG. 2 is a perspective block diagram showing an exemplary memory layout 200 of an electronic device that may correspond to, for example, the mobile device 109 of FIG. 1, in accordance with a representative embodiment of the present invention. The memory layout 200 comprises a NAND NV memory 209 and a random access memory (RAM) 211. As shown in FIG. 2, the NAND NV memory 209 comprises an MVP client 229, resident in a file system 233. In a representative embodiment of the present invention, the MVP client 229 may be capable of updating the NAND-based NV memory 209 of the mobile device when the MVP client is executed in a RAM 211 in the mobile device. The MVP client 229 may update each "Main App" file 221, 223, 225 and 227, that are part of a multiple-file Main App 220, independently. The "Main App" 220 may comprise several small files, especially in a file system 233 that is MS-DOS based. The MVP client 229 may have read/write permissions to "Main App" files 221, 223, 225 and 227 in the file system 233. "Main App" 220 files may not have dependencies upon each other.

In a representative embodiment of the present invention, the MVP client 229 in the NAND NV memory 209 may be loaded to the RAM 211, and may be executed as a loaded executable 259. In addition, the "Main App" 220 files 221, 223, 225 and 227 may be loaded into the RAM 211 and comprise application instances 251, 253, 255 and 257 respectively. Thus, the MVP client copy 229 may update the application instances 251, 253, 255 and 257 in RAM 211, which may then be written into their corresponding instances 221, 223, 225 and 227 in NAND NV memory 209, replacing them.

As illustrated in FIG. 2, a representative embodiment of the present invention may comprise a kernel portion 219, a boot code portion 217, an update agent 215, and an additional memory portion 231.

Figure 3:
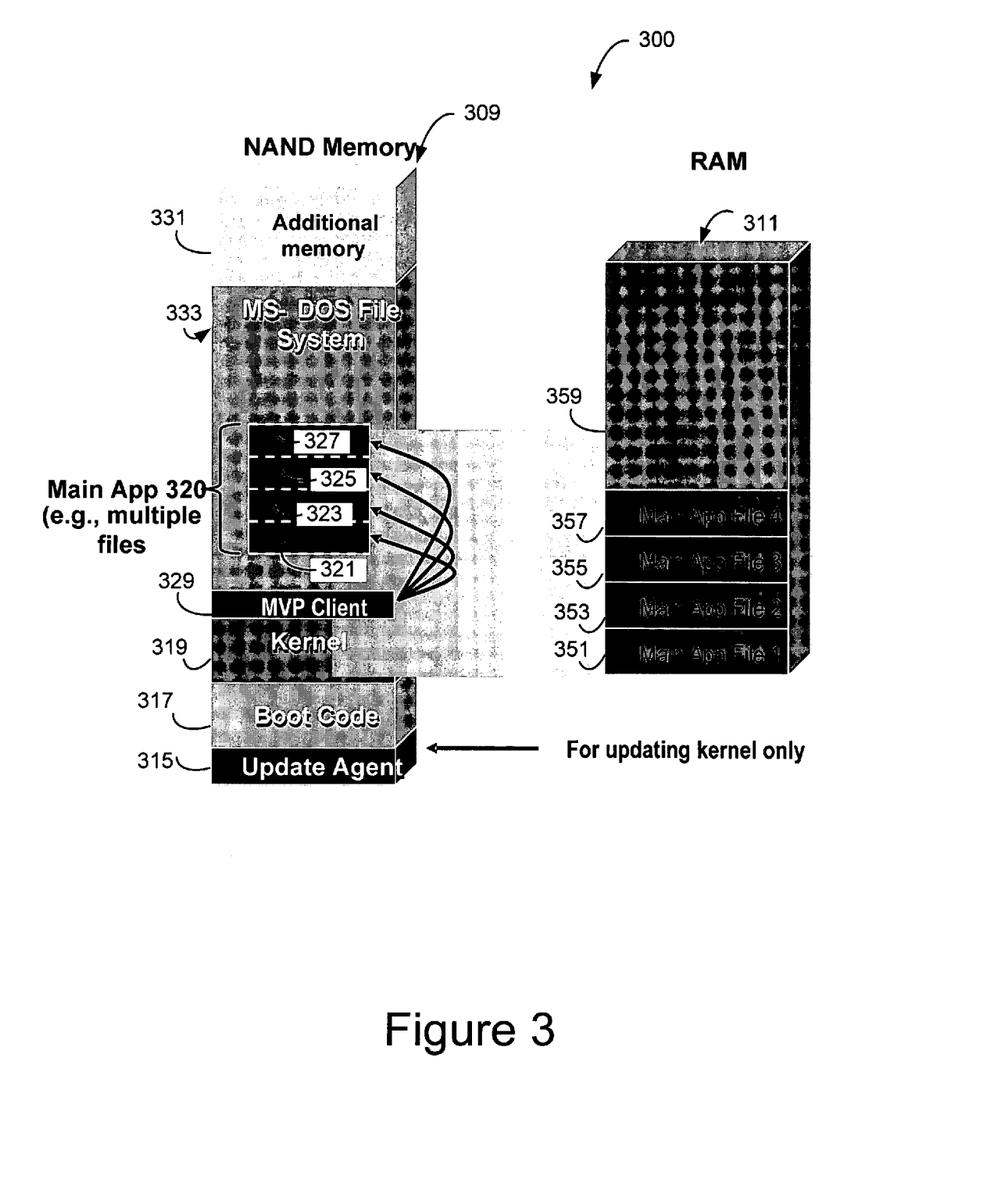
FIG. 3 is a perspective block diagram showing an exemplary memory layout of an electronic device that may correspond to, for example, the mobile device of FIG. 1, in accordance with a representative embodiment of the present invention.

FIG. 3 is a perspective block diagram showing an exemplary memory layout 300 of an electronic device that may correspond to, for example, the mobile device 109 of FIG. 1, in accordance with a representative embodiment of the present invention. The memory layout 300 comprises a NAND NV memory 309 and a RAM 311. The NAND NV memory 309 comprises an additional memory portion 331, MVP client 329, boot code 317, an update agent 315, and a kernel 319, that may be capable of updating the NAND NV memory 309 of the electronic device (e.g., the mobile device 109) when the MVP client 329 is executed in the RAM 311. A kernel such as the kernel 319 may comprise code that initiates execution of an operation system code upon which the normal operation of the electronic device depends. The kernel 319 may interface with firmware code that directly communicates with and/or controls the hardware circuitry of the electronic device. A "Main App" 320 may reside within a Microsoft (MS) disk operating system (DOS) file system 333, which may comprise several small files 321, 323, 325 and 327. In a representative embodiment of the present invention, the MVP client 329 may update each of "Main App" 320 files 321, 323, 325, and 327 independently. The "Main App" 320 files 321, 323, 325, and 327 may be loaded into instances 351, 353, 355 and 357 of the RAM 311, respectively. As shown in FIG. 3, RAM 311 may also comprise additional memory space 359. The MVP client 329 may reside in the kernel 319, and may have read/write permission to Main App 320 files 321, 323, 325 and 327 in file system 333. The "Main App" 320 files may not have dependencies upon one another.

Figure 4:
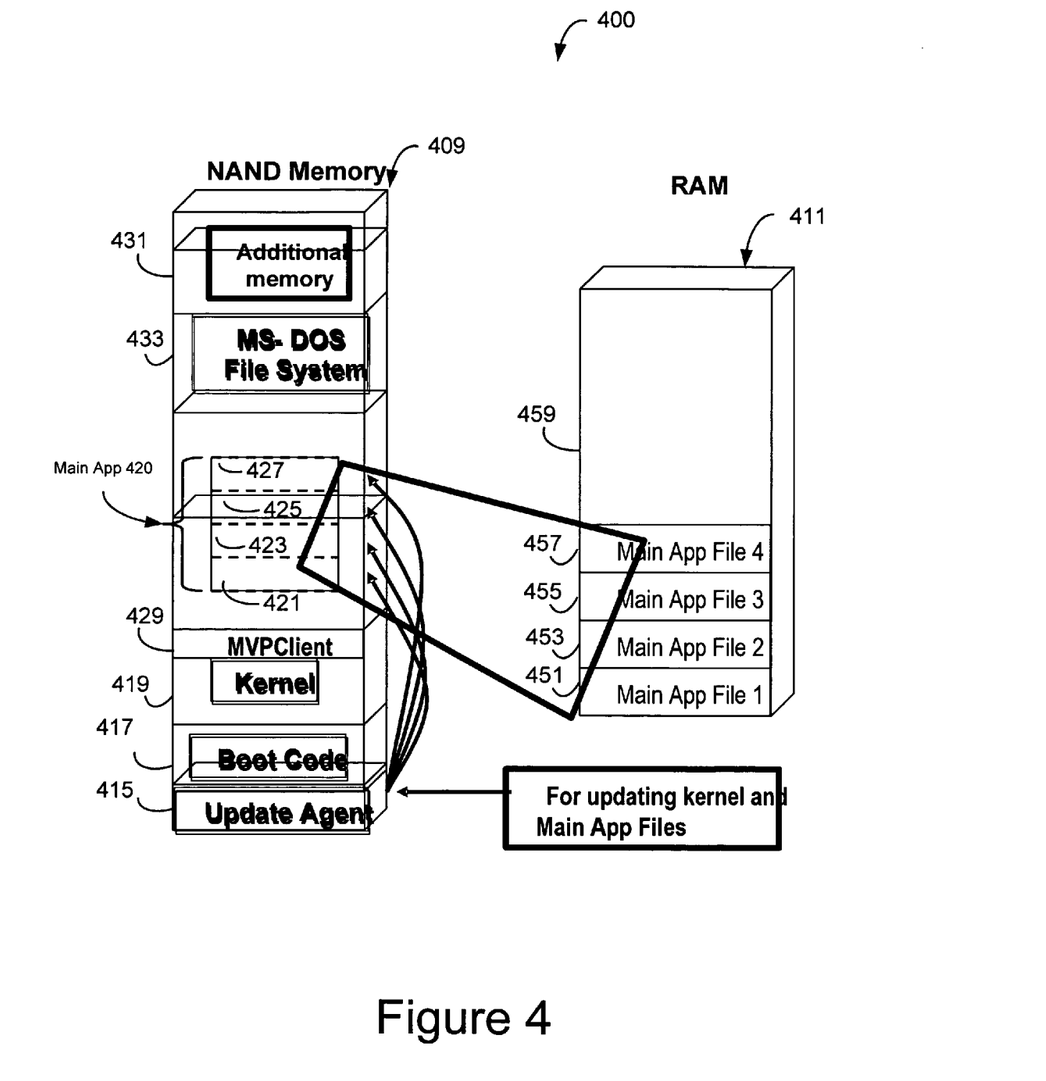
FIG. 4 is a perspective block diagram showing an exemplary memory layout of an electronic device that may correspond to, for example, the mobile device of FIG. 1, in accordance with a representative embodiment of the present invention.

FIG. 4 is a perspective block diagram showing an exemplary memory layout 400 of an electronic device that may correspond to, for example, the mobile device 109 of FIG. 1, in accordance with a representative embodiment of the present invention. The memory layout 400 comprises a NAND NV memory 409 and a RAM 411. As shown in the illustration of FIG. 4, the NAND NV memory 409 comprises an update agent 415, that may be capable of updating a kernel 419, as well as a "Main App" 420 that comprises multiple files 421, 423, 425, 427. The NAND NV memory 409 of the mobile device 109 also comprises an MVP client 429, that may be resident in a kernel 419. The MVP client 429 may be capable of updating the NAND NV memory 409 of the mobile device 109 when the MVP client 429 is executed in a MVP client portion 459 of the RAM 411. The "Main App" 420 files 421, 423 425, and 427 may be loaded into instances 451, 453, 455 and 457 of the RAM 411, respectively. In a representative embodiment of the present invention, the update agent 415 may be capable of updating not only firmware components in the mobile device 109, but also kernel components as well. For example, the "Main App" 420 having multiple files 421, 423, 425, 427 that is resident in file system 433. The file system 433 may comprise, for example, an MS-DOS-type file system. As shown in FIG. 4, the NAND memory 409 may also comprise an additional memory portion 431, and a boot code portion 417.

In a representative embodiment of the present invention, a software stack for file system 433 such as, for example, a software stack for an MS-DOS-type file system may be implemented within the update agent 415. The file system 433 (e.g., an MS-DOS type file system) may be randomly accessible, and may be fault tolerant. Thus, an advantage of employing a representative embodiment of the present invention is that operating system (OS) dependency may be eliminated.

Figure 5:
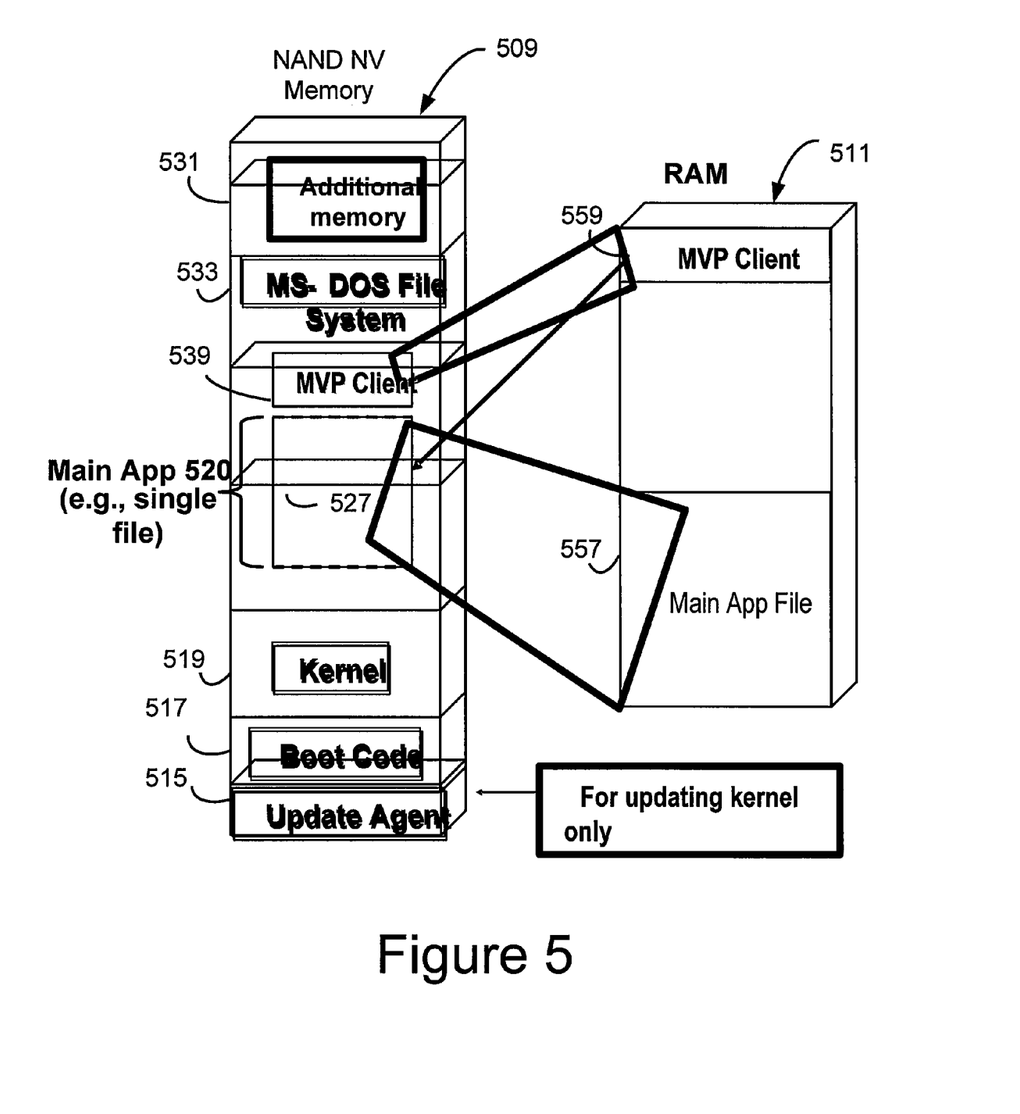
FIG. 5 is a perspective block diagram showing a memory layout of an electronic device that may correspond to, for example, the mobile device of FIG. 1, in accordance with a representative embodiment of the present invention.

FIG. 5 is a perspective block diagram showing a memory layout 500 of an electronic device that may correspond to, for example, the mobile device 109 of FIG. 1, in accordance with a representative embodiment of the present invention. The memory layout 500 comprises a NAND NV memory 509 and a RAM 511. The NAND NV memory 509 comprises an update agent 515 that may be capable of updating a kernel 519, and an MVP client 539 in a file system 533. The MVP client 539 may be capable of updating a "Main App" 520 that may comprise a single file, for example, that may reside in a memory portion 527. The MVP client 539 may update the entire "Main App" file 520 when the MVP client 539 is loaded into an MVP client portion 559 of the RAM 511, for execution. The "Main App" file 520 may also be loaded into the RAM 511, as "Main App" instance 557. In a representative embodiment of the present invention, the "Main App" 520 may comprise a single file in file system 533 that may be, for example, an MS-DOS-type file system. The MVP client 559 may have read/write permissions to the "Main App" file 520 in file system 533. As shown in FIG. 5, the NAND NV memory 509 may also comprise an additional memory portion 531, and a boot code portion 517.

In a representative embodiment of the present invention, the "Main App" 520 may be a large file, and a generator such as the generator 116 of FIG. 1, for example, may create an update package (not shown) for updating the "Main App" 520 using a differencing algorithm that processes an original or first version of the "Main App" 520, and a newer or updated version of the "Main App" 520 to produce the update package. The update package (not shown) may be received by an electronic device such as, for example, the mobile device 109 of FIG. 1, and may be stored in the NAND NV memory 509 following download. The update package may subsequently be loaded into the RAM 511. The update package (not shown) may be used by the MVP client 559 in RAM 511 to update the "Main App" file instance 557 loaded into the RAM 511. If the "Main App" file 520 is not large in size, a received update package may not contain difference information, but may instead contain an entire new version of the "Main App" file 520.

In another representative embodiment of the present invention, the MVP client 539 may be part of the kernel 519 of the electronic device (e.g., the mobile device 109). The MVP client 539 in the kernel 519 may update the entire "Main App" file 520, without the MVP client 539 being loaded into the MVP client portion 559 of the RAM 511. The "Main App" 520 may comprise a single file in file system 533. The MVP client 539 in the kernel 519 may have head/write permissions to "Main App" file 520 in file system 533. As described above, an update package produced using a differencing algorithm in the generator 116 of FIG. 1 may be used, if "Main App" 520 is large in size.

Figure 6:
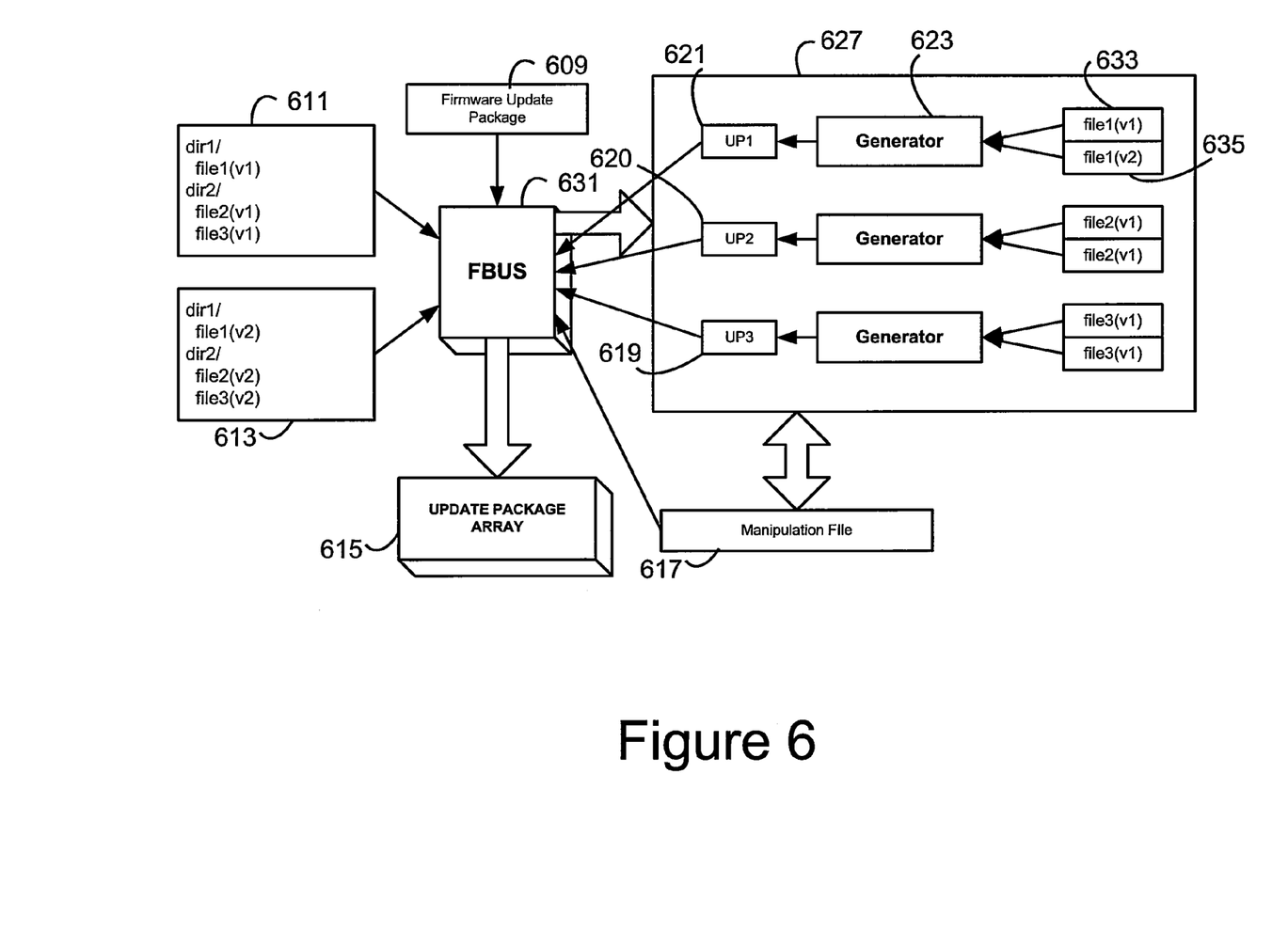
FIG. 6 is a block diagram showing an exemplary file based update shell (FBUS) that supports multiple layer updates such as, for example, an update in firmware and a corresponding update in a file system such as the file system of FIG. 5, for example, in accordance with a representative embodiment of the present invention.

FIG. 6 is a block diagram showing an exemplary file based update shell (FBUS) 631 that supports multiple layer updates such as, for example, an update in firmware and a corresponding update in a file system such as the file system 533 of FIG. 5, for example, in accordance with a representative embodiment of the present invention. The FBUS 631 may support both single-layer and multiple-layer updates. The FBUS 631 may take two file directory trees 611, 613 (e.g., V1 and V2) to generate an update package set for each file in the directories. The FBUS 631 packages each individual update package files UP3 619, UP2 620, UP1 621, a manipulation file 617, and a firmware update package 609, into a single update package array 615. As shown in FIG. 6, in a representative embodiment of the present invention, the individual update package files UP3 619, UP2 620, UP1 621 may be produced by a number of separate generation processes 627 using generators such as the generator 623 of FIG. 6 that is shown processing first version file file1(v1) 633 and second version file file2(v2) 635 to produce update package file UP1 621. An FBUS client (see discussion of FIG. 7, below) in an electronic device such as, for example, the mobile device 109 of FIG. 1 may take the update package array (UPA) 615 and may decouple (e.g., extract) files packaged within the UPA 615, to apply the updates through a standard update method compatible with a generator such as, for example, the generator 623. A file system in which files are to be updated such as, for example, the file system 533 of FIG. 5 may be randomly accessible. The file system may support fault tolerance for file access. In a representative embodiment of the present invention, an FBUS client in the electronic device (e.g., the mobile device 109) may verify that enough free space is available in a file system to hold the final updated file, in addition to the original copy of each individual file being updated.

Figure 7:
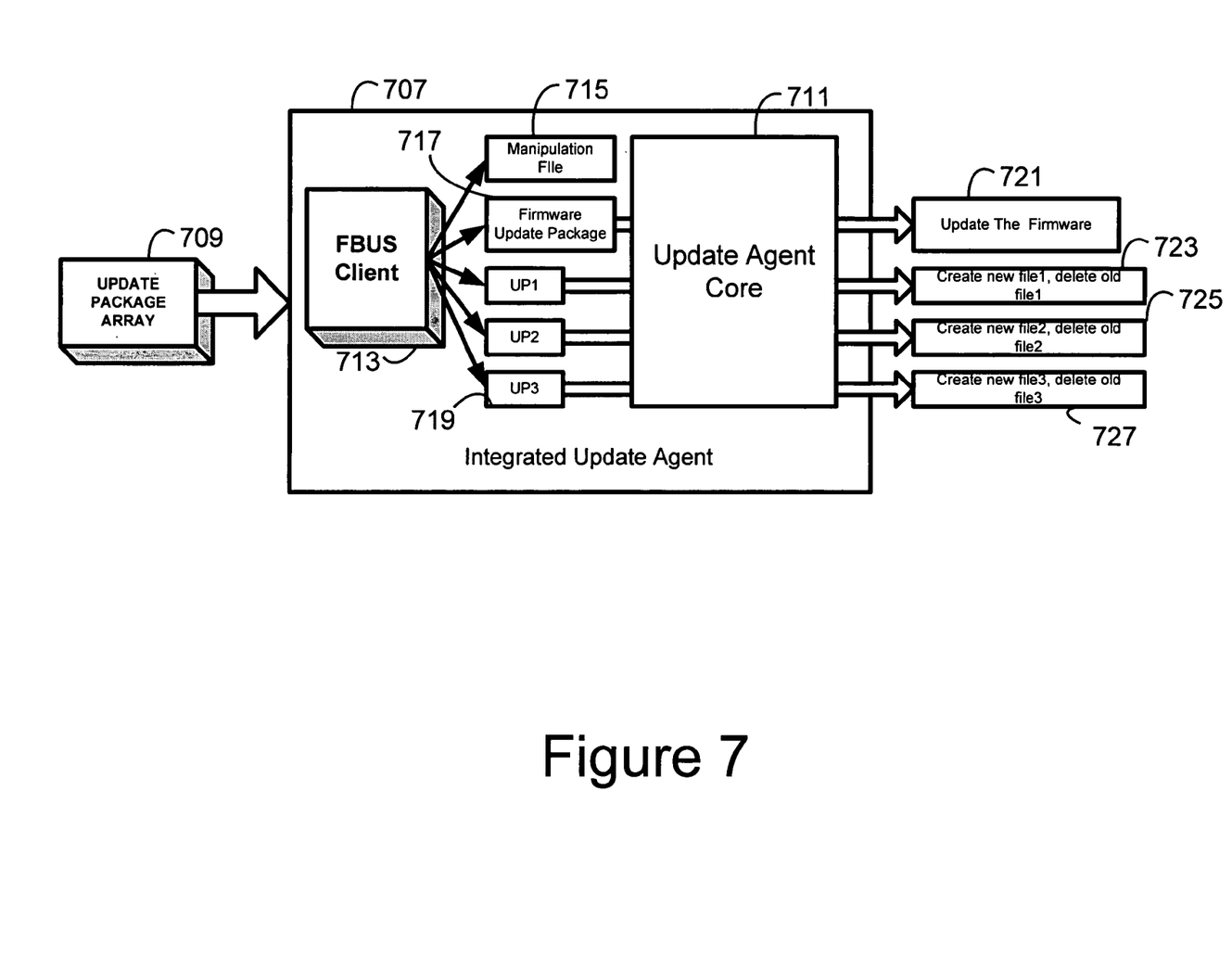
FIG. 7 is a block diagram showing a file based update shell (FBUS) client, that may be incorporated into an integrated update agent of an electronic device that may correspond to, for example, the mobile device of FIG. 1, in accordance with a representative embodiment of the present invention.

FIG. 7 is a block diagram showing a file based update shell (FBUS) client 713, that may be incorporated into an integrated update agent 707 of an electronic device that may correspond to, for example, the mobile device 109 of FIG. 1, in accordance with a representative embodiment of the present invention. An update package array 709 may be processed by the FBUS 713, which may separate the various components of the update package array 709 and may feed a firmware update package 717 and one or more files 719 to be updated, to an update agent core 711. The FBUS 713 may also produce a manipulation file 715 as part of processing the update Package array 709. The update agent core 711 may update the firmware of the electronic device (e.g., the mobile device 109) using fault tolerant methods, as described above and shown in FIG. 7 as an activity 721 of the electronic device. For each of the files 719 to be updated, the update agent core 711 may create a new or updated file, may delete the corresponding old file, and may record the results of the update activity, shown in FIG. 7 as activities 723, 725, 727 of the mobile device 109.

In a representative embodiment of the present invention, the update agent core 711 may create a byte-by-byte compliant update. That is, each updated version of firmware in an electronic device (e.g., the mobile device 109) is an exact replica of a factory installed image. Thus, by employing a representative embodiment of the present invention, each updated version needs to be tested and qualified only once, and only in a single electronic device.

Figure 8:
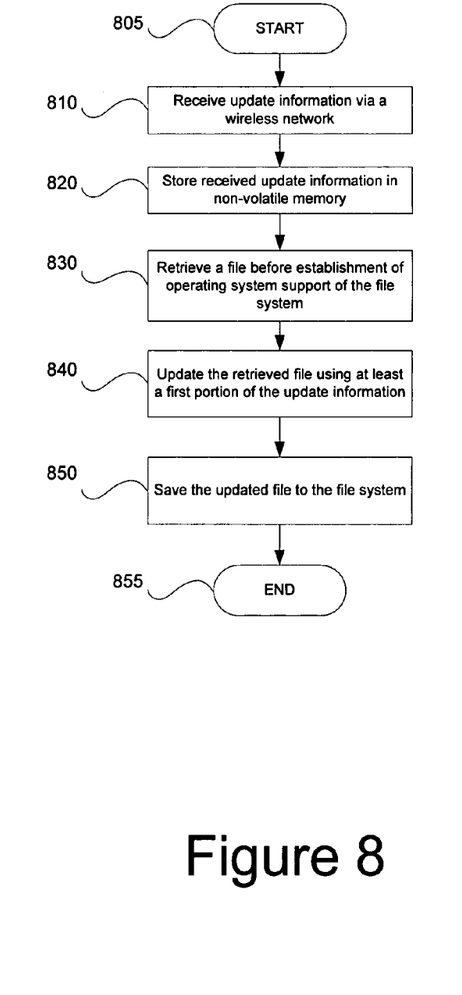
FIG. 8 shows a flowchart of an exemplary method of updating files and firmware in non-volatile memory of an electronic device that may correspond to, for example, the mobile electronic device of FIG. 1, in accordance with a representative embodiment of the present invention.

FIG. 8 shows a flowchart of an exemplary method of updating files and firmware in non-volatile memory of an electronic device that may correspond to, for example, the mobile electronic device 109 of FIG. 1, in accordance with a representative embodiment of the present invention. The method begins, for example, following power-up or reboot of the electronic device (block 805). The electronic device (e.g., the mobile device 109) may receive update information via a wireless network such as, for example, a cellular network (block 810). The electronic device may then store the received update information in non-volatile memory (block 820). In a representative embodiment of the present invention, the non-volatile memory may comprise NAND-based flash memory, for example. The electronic device may then retrieve a file, before file system support is available from an operating system that is used for normal device operation, is established (block 830). The electronic device may then update the retrieved file using at least a portion of the received update information (block 840). In another representative embodiment of the present invention, a portion of firmware code may also be updated using, for example, at least a second portion of the received update information. The updated file may then be saved to the file system (block 850), and the method of FIG. 8 ends (block 855).

Aspects of the present invention may be found in a mobile electronic device having NAND-based non-volatile memory and volatile memory. The mobile electronic device may comprise a file system resident in the NAND-based non-volatile memory, and application code resident in the file system. The application code may comprise a plurality of application files. The mobile electronic device may also comprise client code in the NAND-based non-volatile memory. The client code may copy at least one of the plurality of application files into volatile memory, and may update the at least one of the plurality of application files in volatile memory. The client code may also copy the updated at least one of the plurality of application files from volatile memory into the file system, and may replace the at least one of the plurality of application files. The client code may create a backup copy of the least one of the plurality of application files before copying the updated at least one of the plurality of application files from volatile memory into the file system. The client code may delete the backup copy of the at least one of the plurality of application files after copying the updated at least one of the plurality of application files from volatile memory into the file system. The client code may be resident in the file system, and the mobile device may load the client code into volatile memory to conduct an update of the at least one of the plurality of application files.

A representative embodiment of the present invention may also comprise kernel code for initiating execution of an operating system. The kernel code may interface with hardware circuitry of the mobile electronic device through firmware code, and the client code may be resident in the kernel code. The client code may copy at least one of the plurality of application files into volatile memory from the NAND-based non-volatile memory, and may update the at least one of the plurality of application files in volatile memory. A representative embodiment of the present invention may also comprise update agent code resident in the firmware code, and the update agent code may update the firmware code of the mobile electronic device while the client code updates the at least one of the plurality of application files in volatile memory. The update agent code may update the firmware code of the mobile electronic device and the at least one of the plurality of application files in volatile memory. A representative embodiment of the present invention may also comprise an update package array resident in the NAND-based non-volatile memory, and the update package array may comprise a firmware update package, a manipulation file, and a plurality of update files corresponding to the at least one of the plurality of application files. The client code may employ the plurality of update files to update the at least one of the plurality of application files, and the update agent code may employ the firmware update package to update the firmware code.

In a representative embodiment of the present invention, the at least one of the plurality of application files may be updated using a fault tolerant bank-by-bank technique. The at least one of the plurality of application files may be updated in the mobile electronic device, using a set of executable instructions for converting a first file version to a second file version. The at least one of the plurality of application files may be updated before an operating system used for normal operation of the mobile electronic device, is operational. The mobile electronic device may comprise a cellular phone.

Additional aspects of the present invention may be seen in a method of updating files and firmware in a mobile electronic device having NAND-based non-volatile memory and volatile memory. In such a representative embodiment, the NAND-based non-volatile memory may comprise a file system. Such a method may comprise receiving update information via a wireless network, storing the update information in the NAND-based non-volatile memory, and retrieving a file before establishment of operating system support of the file system. The method may also comprise updating the retrieved file using at least a first portion of the update information, and saving the updated file to the file system. The mobile electronic device may comprise a cellular phone. The updating may be performed using a fault tolerant bank-by-bank method. The wireless network may comprise a cellular network. The method may also comprise updating firmware code using at least a second portion of the update information. The update information may comprise a set of executable instructions for converting a first version of code to a second version of code.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A mobile electronic device having NAND-based non-volatile memory and volatile memory, the mobile electronic device comprising:
    a file system resident in a first portion of the NAND-based non-volatile memory;
    application code resident in the file system, the application code comprising a plurality of application files;
    kernel code resident in a second portion of the NAND-based non-volatile memory separate from the first portion, which enables initiation of execution of an operating system and interfacing with hardware circuitry of the mobile electronic device through firmware code resident in the second portion of the NAND-based non-volatile memory;
    update agent code resident in the firmware code that updates the firmware code;
    client code resident in the kernel code, wherein the client code copies at least one of the plurality of application files into volatile memory, the client code updates the at least one of the plurality of application files in volatile memory, and the client code copies the updated at least one of the plurality of application files from volatile memory into the file system, replacing the at least one of the plurality of application files; and wherein the mobile electronic device employs a bank-by-bank method in which an unintended point of interruption of the update is determined by comparing check values against previously computed check values communicated to the mobile electronic device.

2. The mobile electronic device of claim 1, wherein the client code creates a backup copy of the least one of the plurality of application files before copying the updated at least one of the plurality of application files from volatile memory into the file system.

3. The mobile electronic device of claim 2, wherein the client code deletes the backup copy of the at least one of the plurality of application files after copying the updated at least one of the plurality of application files from volatile memory into the file system.

4. The mobile electronic device of claim 2, wherein:
the client code is resident in the file system; and
the mobile device loads the client code into volatile memory to conduct an update of the at least one of the plurality of application files.

5. The mobile electronic device of claim 1, wherein the client code copies at least one of the plurality of application files into volatile memory from the NAND-based non-volatile memory, and updates the at least one of the plurality of application files in volatile memory.

6. The mobile electronic device of claim 5, wherein the update agent code updates the firmware code of the mobile electronic device and the at least one of the plurality of application files in volatile memory.

7. The mobile electronic device of claim 5, comprising:
an update package array resident in the NAND-based non-volatile memory;
the update package array comprising a firmware update package, a manipulation file, and a plurality of update files corresponding to the at least one of the plurality of application files; the client code employing the plurality of update files to update the at least one of the plurality of application files; and
the update agent code employing the firmware update package to update the firmware code.

8. The mobile electronic device of claim 1, wherein the at least one of the plurality of application files is updated using a fault tolerant bank-by-bank technique.

9. The mobile electronic device of claim 1, wherein the at least one of the plurality of application files is updated in the mobile electronic device, using a set of executable instructions for converting a first file version to a second file version.

10. The mobile electronic device of claim 1, wherein the at least one of the plurality of application files is updated before an operating system used for normal operation of the mobile electronic device, is operational.

11. The mobile electronic device of claim 1, wherein the mobile electronic device comprises a cellular phone.

12. A method of updating files in a mobile electronic device having NAND-based non-volatile memory and volatile memory, the NAND-based non-volatile memory comprising a file system in a first portion of the NAND-based non-volatile memory, the method comprising:
receiving update information via a wireless network;
storing the update information in the NAND-based non-volatile memory;
retrieving a file before establishment of operating system support of the file system;
updating the retrieved file using one of an update agent code resident in firmware resident in a second portion of the NAND-based non-volatile memory or a client code resident in kernel code in the second portion of the NAND-based non-volatile memory using at least a first portion of the update information, wherein if the retrieved file comprises a portion of the firmware, the update agent code is used to update the retrieved file, and if the retrieved file comprises a portion of an application file, the client code is used to update the retrieved file;
saving the updated file to the file system; and
wherein the mobile electronic device employs a bank-by-bank method in which an unintended point of interruption of the updating is determined by comparing check values against previously computed check values communicated to the mobile electronic device.

13. The method of claim 12, wherein the mobile electronic device comprises a cellular phone.

14. The method of claim 12 where the updating is performed using a fault tolerant bank-by-bank method.

15. The method of claim 12 wherein the wireless network comprises a cellular network.

16. The method of claim 12, comprising updating firmware code using at least a second portion of the update information.

17. The method of claim 12 wherein the update information comprises a set of executable instructions for converting a first version of code to a second version of code.

* * * * *